United States Patent [19]
Das et al.

[11] Patent Number: 5,342,878
[45] Date of Patent: Aug. 30, 1994

[54] BASE NEUTRALIZED, STABLE, AQUEOUS DISPERSION OF A HYDROXYL FUNCTIONAL ACRYLIC POLYMER AND COATING COMPOSITIONS PREPARED THEREFROM

[75] Inventors: Suryya K. Das, Pittsburgh; Soner Kilic, Gibsonia, both of Pa.

[73] Assignee: PPG Industries, Inc., Pittsburgh, Pa.

[21] Appl. No.: 13,139

[22] Filed: Feb. 3, 1993

Related U.S. Application Data

[63] Continuation-in-part of Ser. No. 814,658, Dec. 30, 1991, abandoned.

[51] Int. Cl.$^5$ .............................................. C08L 31/00
[52] U.S. Cl. ............................... 524/558; 524/833
[58] Field of Search ................................ 524/558, 833

[56] References Cited

U.S. PATENT DOCUMENTS

| | | | |
|---|---|---|---|
| 4,064,087 | 12/1977 | Das | 260/29.6 RB |
| 4,151,143 | 4/1979 | Blank et al. | 260/29.6 RW |
| 4,276,432 | 6/1981 | Rhum et al. | 526/320 X |
| 4,345,057 | 8/1982 | Yamabe et al. | 526/247 |
| 4,501,868 | 2/1985 | Bouboulis et al. | 526/320 X |
| 4,656,237 | 4/1987 | Weber, Jr. | 526/320 |
| 4,687,822 | 8/1987 | Eugchi et al. | 526/320 X |
| 4,711,944 | 12/1987 | Sherwin et al. | 526/320 X |
| 4,758,642 | 7/1988 | Yezrielev et al. | 526/320 X |
| 4,777,230 | 10/1988 | Kamath | 526/320 X |
| 4,808,656 | 2/1989 | Kania et al. | 524/558 X |
| 4,855,369 | 8/1989 | Yezrielev et al. | 526/320 |
| 4,985,517 | 1/1991 | Yezrielev et al. | 526/320 X |
| 5,037,913 | 8/1991 | Leussler et al. | 526/320 X |
| 5,057,312 | 10/1991 | Langla et al. | 526/320 X |
| 5,084,505 | 1/1992 | Baile | 524/558 X |
| 5,093,408 | 3/1992 | Jung et al. | 524/558 X |
| 5,104,922 | 4/1992 | Chang | 524/558 X |
| 5,118,749 | 6/1992 | Knutson | 524/558 X |
| 5,124,393 | 6/1992 | Ingle et al. | 524/558 X |
| 5,141,988 | 8/1992 | Suwala et al. | 524/558 X |

FOREIGN PATENT DOCUMENTS

| | | | |
|---|---|---|---|
| 0099647 | 2/1984 | European Pat. Off. | 526/320 |
| 0103146 | 3/1984 | European Pat. Off. | 526/320 |
| 0103199 | 3/1984 | European Pat. Off. | 526/320 |
| 0158161 | 10/1985 | European Pat. Off. | 526/320 |
| 0197460 | 10/1986 | European Pat. Off. | 526/320 |
| 0206072 | 12/1986 | European Pat. Off. | 526/320 |
| 0275051 | 7/1988 | European Pat. Off. | 526/320 |
| 320156 | 6/1989 | European Pat. Off. | |
| 341716 | 11/1989 | European Pat. Off. | |
| 2450785 | 5/1976 | Fed. Rep. of Germany | 526/320 |
| 7208621 | 3/1972 | Japan | 526/320 |
| 0106267 | 8/1980 | Japan | 526/320 |
| 0042706 | 3/1982 | Japan | 526/320 |
| 0162708 | 10/1982 | Japan | 526/320 |
| 0013662 | 1/1983 | Japan | 526/320 |
| 0001776 | 1/1984 | Japan | 526/320 |
| 0064614 | 4/1984 | Japan | 526/320 |
| 124705 | 11/1986 | Japan | 526/320 |
| 9000570 | 1/1990 | PCT Int'l Appl. | 526/320 |
| 0859297 | 1/1961 | United Kingdom | 526/320 |
| 1145564 | 3/1969 | United Kingdom | 526/320 |
| 2169911 | 7/1986 | United Kingdom | 526/320 |
| 2196973 | 5/1988 | United Kingdom | 526/320 |
| 2201683 | 9/1988 | United Kingdom | 526/320 |

*Primary Examiner*—Judy M. Reddick
*Attorney, Agent, or Firm*—Linda Pingitore

[57] ABSTRACT

A base neutralized, stable, aqueous dispersion of a hydroxyl functional acrylic polymer containing less than 1 percent acid, having a number average molecular weight ranging from about 500 to about 4500 and having an acid value of at least about 1.5 and no greater than about 10; is prepared from a vinyl monomer component containing at least about 50 percent 2-hydroxyethyl acrylate and at least one other comonomer. The proportion of each monomer is selected so that the resultant polymer forms stable dispersion in water without externally added surfactant. The hydroxyl functional acrylic polymer is especially advantageous in the formulation of waterborne coating compositions which are capable of crosslinking with aminoplast and polyisocyanate curing agents to form a cured film. Furthermore, the hydroxyl functional acrylic polymer is useful as a surfactant in the preparation of dispersion polymers by dispersion polymerization.

4 Claims, No Drawings

5,342,878

BASE NEUTRALIZED, STABLE, AQUEOUS DISPERSION OF A HYDROXYL FUNCTIONAL ACRYLIC POLYMER AND COATING COMPOSITIONS PREPARED THEREFROM

This application is a continuation-in-part of application Ser. No. 07/814,658, filed Dec. 30, 1991 and now abandoned.

CROSS REFERENCE TO RELATED APPLICATIONS

This application is related to U.S. patent application Ser. No. 07/814,657 entitled Aqueous Fluoropolymer Dispersions, filed Dec. 30, 1991.

BACKGROUND OF THE INVENTION

The present invention relates to acrylic polymers which can be dispersed or solubilized in water and are useful as dispersants for preformed polymers or in dispersion polymerization. The invention also relates to coating compositions which utilize the polymers as binders.

Generally speaking, there are two basic ways to synthesize a water reducible or dispersible polymer to be used for the preparation of aqueous coating compositions. In the first instance, a monomer mixture which contains some acid group containing monomer is polymerized such that the resultant polymer contains acid functionality. Acid functional acrylic polymers are an example of this type of material. Alternatively, one can condense mono-, di- or polybasic acids with polyols to form a polyester or alkyd resin in which residual acid functionality is present for the purposes of water dispersion or solubilization. These polymers are water soluble or dispersible when neutralized with an appropriate base such as an amine and an appropriate organic cosolvent. Coating compositions prepared from such polymers can be crosslinked with aminoplast type crosslinking agents which react primarily with the reactive hydroxyl and amide groups of the polymers. Therefore, after cure, the films which are formed from these water solubilized compositions typically contain unreacted carboxyl groups which were utilized in the water solubilization or dispersion process but which were not crosslinked during the curing process. Although, the art discloses systems where anionic carboxyl functional waterborne polymers have been cured with polyepoxides, polyaziridines or carbodiimides to consume the carboxyl functionality by which they are waterborne, these materials are relatively toxic and difficult to handle and necessitate two pack application for stability.

Another manner of preparing water reducible or water solubilized polymers for aqueous coating compositions is with the assistance of externally added surfactants which act as emulsifiers to facilitate the solubilization of the polymer into water even though water solubilizing groups are not necessarily present.

These two approaches to the preparation of water reducible or water solubilized materials share several advantages and disadvantages. The materials are advantageous because they permit the formulation of water based coating compositions which have typically a low volatile organic content and at the same time have a variety of good coating properties such as ease of application, good gloss and general appearance. The common disadvantage of the two approaches is the diminished water resistance of coating compositions formulated from the water dispersible polymer. In the first approach, water sensitivity is imparted to the coating from the residual unreacted acid groups which remain after cure of the coating composition. These groups adversely affect the coating's ability to withstand humid environments and also contribute to diminished corrosion resistance and adhesion of the coating. In the second instance, the surfactants which are utilized to assist in emulsification or solubilization of the polymer into water are themselves highly water soluble materials and hence contribute to the overall water sensitivity of coating films derived from such polymers. Once again, the presence of these materials in the film adversely affects the film's ability to withstand humid environments and also diminish the corrosion resistance properties of the film as well as the adhesion.

There is a need, therefore, for a waterborne polymer which is capable not only of being solubilized into water but also cured by curing agents such as aminoplast and blocked isocyanate crosslinking agents without the presence of acid functionality or externally added surfactants.

SUMMARY OF THE INVENTION

In accordance with the present invention there is provided a base neutralized, stable aqueous dispersion of a hydroxyl functional acrylic polymer containing less than 1 percent acid and having a number average molecular weight ranging from about 500 to about 4500 and having an acid value of at least about 1.5 and no longer greater than about 10. The polymer is synthesized from a vinyl monomer component comprising at least about 50 percent of 2-hydroxyethyl acrylate and at least one other comonomer. The proportion of each monomer and the acid value is adapted to provide a polymer which forms stable dispersion in water without externally added surfactant.

DETAILED DESCRIPTION OF THE INVENTION

The waterborne hydroxyl functional acrylic polymer of the present invention is cured by virtue of the functionality which renders it waterborne leaving no affinity for water or humidity in the cured film.

A very important aspect of the present invention is the acid content of the hydroxyl functional acrylic polymer. The claimed hydroxyl functional acrylic polymer contains less than 1 percent acid. In addition, the hydroxyl functional acrylic polymer has an acid value of at least about 1.5 and no greater tan about 10. The polymer is synthesized from a vinyl monomer component which contains at least about 50 percent by weight of 2-hydroxyethyl acrylate. Preferably about 50 percent of 2-hydroxyethyl acrylate is utilized in preparation of the claimed hydroxyl functional acrylic polymer. The vinyl monomer component also comprises at least one other vinyl comonomer. The proportion of the 2-hydroxyethyl acrylate and the other vinyl comonomer can vary with the proviso that the proportion of each monomer utilized is adapted to provide a resultant hydroxyl functional acrylic polymer which is capable of forming a stable dispersion in water without externally added surfactant. Therefore, depending upon the choice of comonomer in the vinyl monomer component, the amount of 2-hydroxyethyl acrylate which is utilized may be substantially more than 50 percent so long as the resultant polymer exhibits the requisite dispersibility in water. The use of 2-hydroxyethyl acrylate is critical to achieve a hydroxyl functional acrylic polymer which has less than 1 percent acid. By virtue of the manner for its preparation, the 2-hydroxyethyl acrylate monomer contains residual acid content which facilitates solubilization of a polymer prepared from the monomer, without the direct incorporation of acid functional monomers or the use of externally added surfactants. It is believed the source of acid is partly from the acrylic acid residue in commercially available 2-hydroxyethyl acrylate and partly from the specific synthesis by tert-butylperbenzoate as initiator. It should be understood that a very important aspect of the claimed invention is the acid value of the hydroxyl functional acrylic polymer. The polymer should have an acid value of at least about 1.5 but no greater than about 10. Acid values of less than about 1.5 are not preferred because dispersion of the polymer into water cannot be accomplished. Acid values greater than about 10 are not preferred because the polymer has a tendency to diminish water resistance of coating compositions prepared with the polymer.

It is believed that the choice of free radical polymerization initiator used in the synthesis of the hydroxyl functional acrylic polymer can influence the acid value of the polymer product formed. For example, certain initiators such as tertiary-butyl perbenzoate produce acid as a result of oxidation of the polymer backbone. This acid contributes to the acid value of polymer product formed and facilitates dispersion of the polymer into water. Other initiators such as VAZO-67 from E. I. DuPont de Nemours & Company (2,2'-azobis(2-methylbutane nitrile)) do not oxidize the polymer backbone to generate acid groups and hence do not contribute to the acid value of the polymer product formed.

It should be understood that the acid value as well as the proportion of each monomer used in synthesis should be adapted to form a stable dispersion in water. When the proportion of 2-hydroxyethyl acrylate is about 50 percent, the acid value of the resultant polymer should be at the higher end of the acid value range of from at least about 1.5 but not greater than 10. For proportions of 2-hydroxyethyl acrylate which are substantially, higher than 50 percent, the acid value of the polymer can be at the lower end of the range.

The hydroxyl functional acrylic polymer of the present invention is capable of forming a stable dispersion in water after neutralization of the minor amount of residual acid with a minor amount of basic material such as an amine. The amount of base required is typically much less than is normally required for neutralization of polymeric materials which contain acid functionality from the incorporation of acid functional monomers. This quality provides further advantages, particularly when the claimed hydroxyl functional acrylic polymers are utilized as dispersants in the free radical polymerization of fluoroolefins. Fluoroolefins readily undergo dehydrohalogenation and discoloration under aqueous basic environments. Therefore, the utilization of a dispersant in the polymerization process which contains minimal residual base avoids this difficulty and leads to a resultant aqueous fluoropolymer dispersion which exhibits minimal to no dehydrohalogenation and discoloration.

A commercially available 2-hydroxyethyl acrylate typically contains less than 1 percent acid, typically about 0.6 percent acid. A hydroxyl functional acrylic polymer prepared from about 50 percent of 2-hydroxyethyl acrylate and other comonomers results in a polymer containing less than 1 percent acid, preferably 0.5 percent acid.

The comonomer which is utilized in conjunction with the 2-hydroxyethyl acrylate can be selected from a wide variety of vinyl monomers. Examples of suitable vinyl monomers include n-butyl methacrylate which is preferred as well as methyl methacrylate and butyl acrylate. Preferably, the vinyl monomer component contains about 50 percent of 2-hydroxyethyl acrylate, as was mentioned above, and about 50 percent of n-butyl methacrylate, the percentage being based on the total weight of the vinyl monomer component. These percentages may vary depending upon the particular vinyl monomer and its ability to facilitate solubilization of the hydroxyl functional acrylic polymer into water in conjunction with the proportion of 2-hydroxyethyl acrylate which is selected.

As was mentioned above the amount of neutralizing base which is utilized to facilitate solubilization of the hydroxyl functional acrylic polymer into water generally varies from about 0.5 percent to about 10 percent, preferably from about 1 to about 5 percent. Examples of suitable neutralizing bases include dimethylethanolamine, N-ethyl-morpholine, triethylamine and ammonia.

The hydroxyl functional acrylic polymer generally has a number average molecular weight ranging from about 500 to about 4500, preferably from about 2500 to about 4500 as determined by gel permeation chromatography using a polystyrene standard. The polymer is prepared by free radical initiated solution polymerization in the presence of a free radical initiator and an organic solvent which is preferably hydroxyl free and primarily non polar such as xylene, isopropyl benzene, high boiling ketones such as isobutyl ketone and high boiling esters such as hexyl acetate. It should be understood that for amounts of 2-hydroxyethyl acrylate which are substantially more than 50 percent, a polar solvent such as isopropanol is preferred to facilitate stable dispersion of the resultant hydroxyl functional acrylic polymer in water. For example, in an embodiment which utilizes 60 percent or more of 2-hydroxyethyl acrylate, use of isopropanol during the polymerization of the acrylic polymer facilitates the subsequent dispersion into water because the polymer is soluble in isopropanol. As one skilled in the art of polymer chemistry appreciates, the solvent used during synthesis should be one in which the resultant polymer is soluble, otherwise phase separation and precipitation of the polymer will likely occur. Even when a preferred amount of 2-hydroxyethyl acrylate is utilized, some solvents such as aromatic petroleum distillates like AROMATIC 100 solvent have higher reflux temperatures, which higher temperatures can lead to a condensation reaction between acid and hydroxyl groups of the polymer resulting in a crosslinked matrix sufficient to retard the polymer's dispersibility in water. The polymerization is generally carried out at a temperature of from about 100° C. to about 200° C., preferably from about 120° C. to 160° C. The polymer is prepared by solution polymerization in the organic solvent followed by neutralization, the addition of water and removal of the organic solvent by azeotropic distillation. It should be pointed out that although the proportion of 2-hydroxyethyl acrylate and other comonomers can vary at least about 50 percent by weight of 2-hydroxyethyl acrylate must be used to provide a polymer which is capable of stable dispersion in water. In the instance of significantly less than 50 percent of 2-hydroxyethyl acrylate, for example, 40 percent by weight, the resultant polymer is not dispersible in water.

As was mentioned above, the claimed hydroxyl functional acrylic polymer of the present invention is especially advantageous in the formulation of waterborne coating compositions which are capable of crosslinking with aminoplast and polyisocyanate curing agents to form a cured film. The coating compositions have good properties and are less susceptible to humidity and water. Of further significance, the claimed hydroxyl functional acrylic polymer is useful as a surfactant in the preparation of dispersion polymers by dispersion polymerization of a dispersed monomer phase in the presence of a continuous phase. Here again, the emulsifier is capable of participating in the polymerization and becoming an integral part of a cured film without contributing to humidity and water sensitivity.

The following examples are illustrative of the invention and are not intended to be limiting.

DISPERSANT PREPARATION

EXAMPLE 1

The following initial charge and feeds were used in the preparation of an acrylic polymer of the invention by solution polymerization technique.

| Ingredients | Initial Charge | Parts by Weight |
|---|---|---|
| Xylene | | 75.4 |
| | Feed A | |
| tert-butyl perbenzoate | | 19.6 |
| Xylene | | 23.5 |
| | Feed B | |
| 2-hydroxyethyl acrylate | | 195.9 |
| n-butyl methacrylate | | 195.9 |
| | Feed C | |
| Xylene | | 2.0 |
| | Feed D | |
| Xylene | | 2.0 |

The initial charge was heated in a reaction vessel with agitation to reflux temperature (141°–143° C.). Feeds A and B were initiated simultaneously and continued in a substantially continuous manner over a period of 3 hours while maintaining the reaction mixture at reflux temperature. At the completion of Feeds A and B, the addition funnels were rinsed with Feeds C and D, and the reaction mixture was held for 2 hours at 141° C. to complete the polymerization. The reaction mixture was cooled and filtered through 25 micron filter bag. The resultant acrylic polymer had a total solids content of 80.2 percent determined at 110° C. for one hour and number average molecular weight of 3557 as determined by gel permeation chromatography (GPC) using polystyrene standard. The polymer has an acid value of about 9.

The acrylic polymer prepared in xylene by solution polymerization technique was dispersed into aqueous medium as follows:

| Ingredients | Initial Charge | Parts by Weight |
|---|---|---|
| Acrylic resin in xylene | | 200.6 |
| | Feed A | |
| Deionized water | | 426.4 |

-continued

| Ingredients | Initial Charge | Parts by Weight |
|---|---|---|
| N,N-dimethylethanolamine | | 8.0 |
| | Feed B | |
| Deionized water | | 10.0 |

The initial charge was heated to a temperature of 82° C. with agitation in a reaction vessel suitable for azeotropic distillation under atmospheric pressure. Feed A was added to the reaction vessel over 1 hour period while maintaining the temperature of the mixture at 82°–84° C. At the completion of the addition of Feed A, the addition funnel was rinsed with Feed B and the reaction mixture was heated to azeotropic distillation temperature. After azeotropic distillation of xylene the product was cooled and filtered to yield an aqueous dispersion with a resin content of 26.1 percent, pH of 9.2, xylene content of 0.1 percent and particle size 613 Angstrom.

DISPERSION PREPARATION

The following examples show the preparation of crosslinked and non-crosslinked aqueous dispersions using the aqueous dispersant of Example 1.

EXAMPLE I

The following initial charge and feeds were used in the preparation of a non-crosslinked aqueous dispersion in the presence of aqueous dispersant of Example 1.

| Ingredients | Initial Charge | Parts by Weight |
|---|---|---|
| Aqueous dispersant of Example 1 | | 288.0 |
| Deionized water | | 238.7 |
| | Feed A | |
| n-butyl methacrylate | | 28.3 |
| n-butyl acrylate | | 18.8 |
| Methyl methacrylate | | 4.3 |
| Hydroxypropyl methacrylate | | 24.0 |
| VAZO-67[1] | | 1.1 |

[1]2,2'-Azobis(2-Methylbutanenitrile), available from E. I. du Pont de Nemours & Company.

The initial charge was heated to 85° C. with agitation in a reaction vessel suitable for aqueous dispersion polymerization. Feed A was added in a substantially continuous manner over a period of 2 hours while maintaining the reaction temperature at 84°–85° C. At the completion of Feed A the reaction mixture was held for 2 hours at 84°–85° C. to complete the polymerization. Finally, the reaction mixture was allowed to cool to room temperature. The resultant aqueous dispersion had a total solids of 23.3 percent determined at 110° C. for one hour and pH of 7.0.

EXAMPLE II

The following example shows the preparation of a crosslinked dispersion by aqueous dispersion polymerization technique using the polymer of Example 1 as a dispersant. The following initial charge and feeds were used in the polymerization.

| Ingredients | Initial Charge | Parts by Weight |
|---|---|---|
| Aqueous dispersant of | | 438.9 |

| Ingredients | Initial Charge | Parts by Weight |
|---|---|---|
| Example 1 | | |
| Deionized water | | 300.0 |
| Feed A | | |
| n-butyl acrylate | | 7.8 |
| Methyl methacrylate | | 7.2 |
| VAZO-67 | | 0.4 |
| Feed B | | |
| n-butyl acrylate | | 49.0 |
| Methyl methacrylate | | 49.0 |
| Divinylbenzene | | 2.0 |
| VAZO-67 | | 2.5 |

[1] A mixture of meta plus para divinylbenzene (55.5%) and meta plus para ethylvinylbenzene (42.0%), available from Dow Chemicals.

The initial charge was heated to 87° C. with agitation in a reaction vessel suitable for aqueous dispersion polymerization. Feed A was added and the temperature of the reaction was held at 86° C.–87° C. for 1 hour. Feed B was added in a substantially continuous manner over a period of 3 hours while maintaining the reaction temperature at 85°–86° C. At the completion of Feed B the reaction mixture was held for 2 hours at 86° C. to complete the polymerization. Finally, the reaction mixture was allowed to cool to room temperature. The resultant aqueous dispersion had a total solids of 26.8 percent determined at 110° C. for one hour and pH of 7.1.

What is claimed is:

1. A base neutralized, stable, aqueous dispersion of a hydroxyl functional acrylic polymer containing less than 1 percent acid and having a number average molecular weight ranging from about 500 to about 4500 and having an acid value of at least about 1.5 and no greater than about 10, synthesized from a vinyl monomer component comprising at least about 50 percent of 2-hydroxyethyl acrylate and at least one other comonomer, the percentages based upon the total weight of the vinyl monomer component, the proportion of each monomer and the acid value being adapted to provide a polymer which forms a stable dispersion in water without externally added surfactant.

2. The aqueous dispersion of claim 1 wherein the number average molecular weight ranges from about 2500 to about 4500.

3. The aqueous dispersion of claim 1 wherein the hydroxyl functional polymer contains about 0.5 percent acid.

4. The aqueous dispersion of claim 1 wherein the vinyl monomer component is a mixture of about 50 percent 2-hydroxyethyl acrylate and about 50 percent n-butyl acrylate, the percentages based on the total weight of the vinyl monomer component.

* * * * *